United States Patent
Busse et al.

(10) Patent No.: US 6,194,014 B1
(45) Date of Patent: *Feb. 27, 2001

(54) PROCESS FOR PREPARING CHOCOLATE COATING AND CONFECTIONARY PRODUCTS CONTAINING SAME

(75) Inventors: Kurt Busse, Radnor; Edward Kuehl, Dublin, both of OH (US); Michaël Peter Gray, Beauvais (FR); William French, Dublin, OH (US)

(73) Assignee: Nestec S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 08/986,185

(22) Filed: Dec. 5, 1997

(51) Int. Cl.⁷ ............... A23G 9/04; A23G 3/20; A23G 3/24

(52) U.S. Cl. ............ 426/249; 426/303; 426/304; 426/306; 426/307; 426/383; 426/660; 426/100; 426/101

(58) Field of Search .................. 426/515, 389, 426/100, 101, 249, 513, 514, 512, 660, 565, 302–307, 309, 383

(56) References Cited

U.S. PATENT DOCUMENTS

| | | | |
|---|---|---|---|
| 615,191 | 11/1898 | Lembke . | |
| 787,887 | * 4/1905 | Baker | 426/383 |
| 859,125 | * 7/1907 | Short | 426/383 |
| 1,546,000 | * 7/1925 | Bausman | 426/383 |
| 1,777,896 | * 10/1930 | Rossi | 426/249 |
| 1,865,097 | * 6/1932 | Gilham | 426/249 |
| 1,911,875 | * 5/1933 | Bausman | 426/383 |
| 1,957,315 | * 5/1934 | Brimer | 426/383 |
| 2,246,871 | 6/1941 | Balch | 107/54 |
| 2,288,970 | * 7/1942 | Weisbender | 426/101 |
| 2,418,190 | * 4/1947 | Overland | 426/303 |
| 2,457,110 | * 12/1948 | Burbank et al. | 99/134 |
| 2,570,031 | 10/1951 | Gibson | 99/137 |
| 2,586,684 | * 2/1952 | McNamara | 426/383 |
| 2,725,831 | * 12/1955 | Zimmer | 426/383 |
| 2,911,304 | * 11/1959 | Wenger | 426/383 |
| 3,091,194 | 5/1963 | Dickinson | 107/54 |
| 3,228,357 | * 1/1966 | Bruschke et al. | 426/383 |
| 3,230,906 | * 1/1966 | MacManus | 426/383 |
| 3,285,202 | * 11/1966 | MacManus | 426/383 |
| 3,659,519 | * 5/1972 | MacManus | 426/383 |
| 3,690,896 | * 9/1972 | Maxwell | 99/81 |
| 3,770,460 | * 11/1973 | Urdman | 426/279 |
| 3,851,075 | * 11/1974 | Wisdom | 426/383 |
| 3,971,853 | * 7/1976 | Crowder | 426/249 |
| 4,105,801 | 8/1978 | Dogliotti | 426/99 |
| 4,189,502 | * 2/1980 | Rubenstein | 426/249 |
| 4,369,200 | * 1/1983 | Iwao et al. | 426/660 |
| 4,382,968 | * 5/1983 | Akutgawa | 426/249 |
| 4,421,773 | * 12/1983 | Akutgawa | 426/249 |
| 4,477,473 | * 10/1984 | Schoonmaker et al. | 426/231 |
| 4,502,376 | * 3/1985 | Cossé | 426/383 |
| 4,563,358 | 1/1986 | Mercer et al. | 426/89 |
| 4,587,128 | * 5/1986 | Cummings | 426/303 |
| 4,747,541 | * 5/1988 | Morine et al. | 239/127 |
| 4,758,143 | * 7/1988 | Lopes | 425/91 |
| 4,778,683 | * 10/1988 | Newsteder | 426/249 |
| 4,873,104 | * 10/1989 | Butcher et al. | 426/249 |
| 4,910,661 | * 3/1990 | Barth et al. | 364/167.01 |
| 4,946,696 | * 8/1990 | Nendl et al. | 426/383 |
| 4,986,080 | * 1/1991 | Grigoli et al. | 62/75 |
| 5,019,404 | * 5/1991 | Meisner | 426/249 |

(List continued on next page.)

Primary Examiner—Cynthia L. Nessler
(74) Attorney, Agent, or Firm—Pennie & Edmonds LLP

(57) ABSTRACT

A chocolate coating having a marbled appearance, a confectionary product provided with a chocolate coating having a marbled appearance, and methods for preparing the same. The chocolate coating may be water or chocolate based.

11 Claims, 4 Drawing Sheets

(3 of 4 Drawing Sheet(s) Filed in Color)

U.S. PATENT DOCUMENTS

| | | | |
|---|---|---|---|
| 5,229,149 | * | 7/1993 | Cone ........................................ 426/91 |
| 5,248,338 | * | 9/1993 | Price ....................................... 106/712 |
| 5,256,426 | | 10/1993 | Tomioka et al. ...................... 426/100 |
| 5,343,710 | * | 9/1994 | Cathenaut et al. ....................... 62/71 |
| 5,374,436 | * | 12/1994 | White et al. .......................... 426/249 |
| 5,407,691 | * | 4/1995 | Przelomski et al. ................. 426/383 |
| 5,435,143 | * | 7/1995 | Heinrich .................................. 62/75 |
| 5,447,036 | * | 9/1995 | Heinrich .................................. 62/75 |
| 5,480,664 | * | 1/1996 | Ferrero ................................. 426/307 |
| 5,516,540 | * | 5/1996 | Cathenaut ............................ 426/249 |
| 5,582,856 | * | 12/1996 | White et al. .......................... 426/249 |
| 5,692,433 | * | 12/1997 | Akesson et al. ..................... 99/450.4 |
| 5,720,175 | * | 2/1998 | White et al. ............................. 62/76 |
| 5,820,906 | * | 10/1998 | Akesson et al. ...................... 426/383 |

* cited by examiner

PROCESS FOR PREPARING CHOCOLATE COATING AND CONFECTIONARY PRODUCTS CONTAINING SAME

FIELD OF THE INVENTION

The present invention relates a coating for confectionery or ice cream, more particularly to a coating having a marbled appearance.

BACKGROUND OF THE INVENTION

It has not been possible heretofore to produce chocolate coatings having a marbled appearance formed from two layers of chocolate, principally because there is only a very short time period within which the second layer must be applied to the first layer in order to achieve satisfactory adherence. The chocolate layers are usually applied in liquid form either by spraying, pouring or dipping in a cold environment and very soon after the first layer has been applied (less than 30 seconds), it glazes over to form a frost of condensation which prevents the second liquid layer from adhering.

We have now devised methods of obtaining coatings having a marbled appearance which coating material may be not only chocolate but also non-aerated ice cream mixes or mixes of similar composition, sorbets, water ices and fruit purees as well as confectionery or ice cream products having a coating made of any of the above materials formed from two layers whereby the second layer adheres satisfactorily to the first layer.

In this invention, "marbled appearance" as hereinafter used means a random or regular surface pattern of more than one shape or colour. For instance, it may include patterns or appearances such as marbled, mottled, hued, variegated, dappled, clouded, drizzle, grizzle, splattered, blown, striped, spotted, speckled, striated, veined or flecked, etc.

SUMMARY OF THE INVENTION

According to the present invention there is provided a coating having a marbled appearance suitable for a confectionery or ice cream product.

The present invention also provides a confectionery or ice cream product provided with a coating having a marbled appearance.

BRIEF DESCRIPTION OF THE DRAWINGS

The filed of this patent contains at least one drawing executed in color. Copies of the patent with color drawing(s) will be provided by the Patent and Trademark Office upon request and payment of the necessary fee.

DETAILED DESCRIPTION OF THE INVENTION

Figure 1:
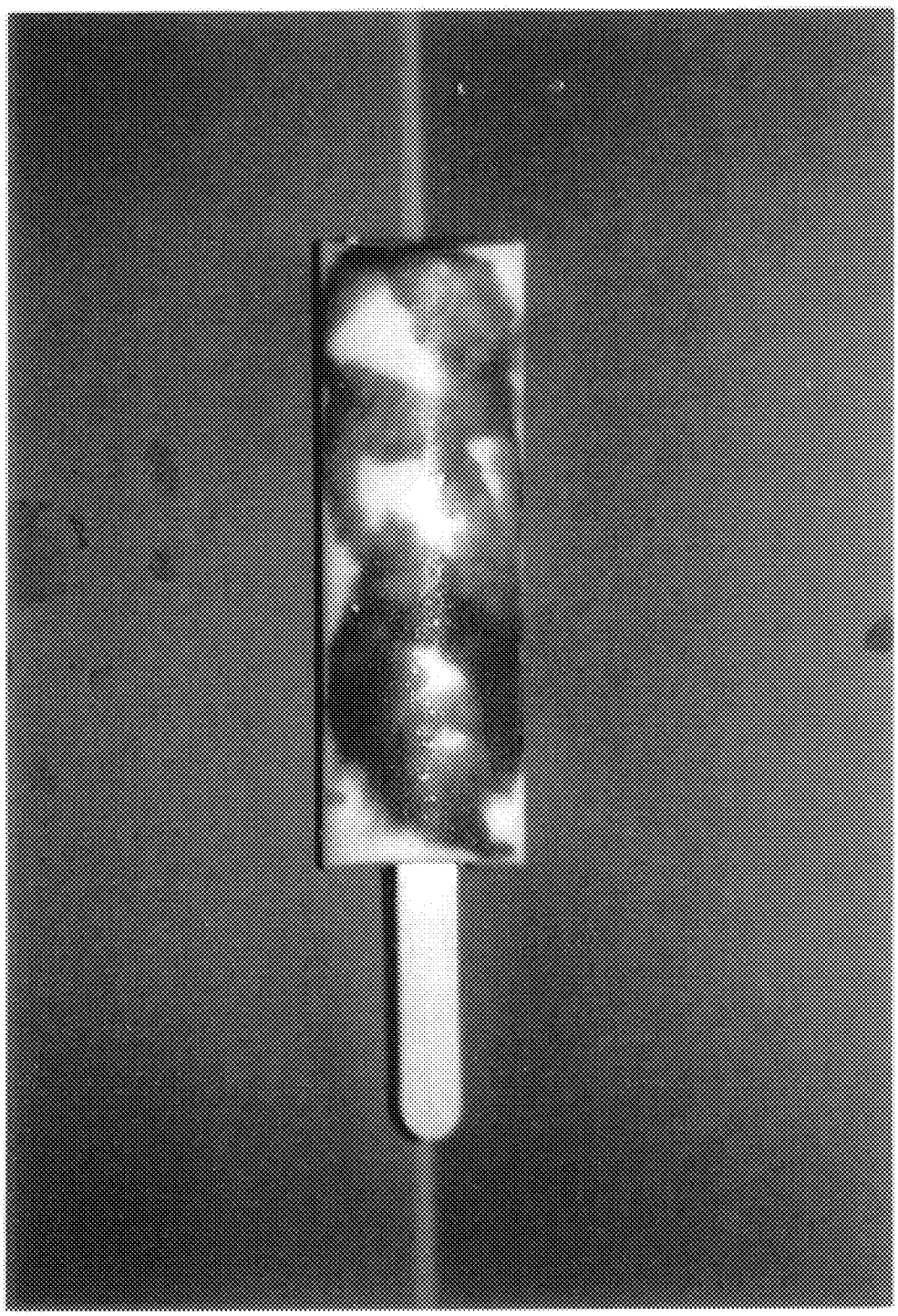
FIG. 1. illustrates an ice cream bar coated with white and milk chocolate having a marbled appearance embodiment of the present invention.

The coating is prepared from a coating material which may be chocolate, or a water-based material such as creamy mixes, non-aerated ice cream mixes, sorbets, water ices or fruit purees.

Preferably, the coating consists of more than one type of coating material, for instance, a material of two different colours. Advantageously, the coating is formed from two layers of coating material. The layers may be continuous or discontinuous.

Particularly attractive coatings may have the appearance of a dipped bar with a generally linear marbled effect, a blown bar with a less linear marbled effect, drizzle with a roughly continuous stripe or random spots, or splatter with a roughly discontinuous stripe.

When the coating is a chocolate coating, it preferably consists of more than one type of chocolate, especially two types of chocolate. Advantageously, the chocolate coating is formed from two layers of chocolate. The chocolate layers may be continuous or discontinuous. Preferably, the layers of the chocolate coating formed from two layers of chocolate are formed from different chocolates and more especially from chocolates of different colours, e.g. plain chocolate, milk chocolate or white chocolate. Coatings in which one layer consists of either milk or plain chocolate and the other layer consists of white chocolate are the most interesting visually because there may be a marked contrast between the milk or plain chocolate and the white chocolate. Each layer of chocolate has a thickness of from, for example, 0.1 to 2mm, preferably from 0.25 to 1 .5mm and especially from 0.5 to 1.0 mm.

The chocolate may be, for instance, ordinary chocolate according to accepted regulations or it may be a fat containing confectionery compound material containing sugar, milk derived components, and fat and solids from vegetable or cocoa sources in differing proportions having a moisture content less than 10%, more usually less than 5% by weight. The fat-containing material may be a chocolate substitute containing direct cocoa butter replacements, stearines, coconut oil, palm oil, butter or any mixture thereof; nut pastes such as peanut butter and fat; praline; confectioner's coatings used for covering cakes usually comprising chocolate analogues with cocoa butter replaced by a cheaper non-tempering fat; or "Caramac" sold by Nestle comprising non-cocoa butter fats, sugar and milk.

When the coating is a water-based material, it may be a water-based creamy mix, a non-aerated ice cream mix without overrun, a coloured or flavoured sorbet, water ice or fruit puree of a suitable viscosity provided there were no fibrous pieces of significant size present. The water-based creamy mix contains at least 10% water, more usually at least 25% by weight water, preferably from 30 to 70% and more preferably from 35 to 60% by weight water together with from, for instance, 2.5 to 10% cream, 15–25% white chocolate, sugar and emulsifiers, optionally with colouring material.

The confectionery or ice cream product which is coated with the coating having a marbled appearance may be, for instance, ice cream or it may be any other confectionery product which may conventionally be coated with chocolate or other materials, e.g. praline, cake, fondant or other filling.

The present invention also provides a process for preparing a coating having a marbled appearance which comprises laying strips of liquid coating material across a mould, modifying the surface or configuration of the strips and solidifying the coating material.

The mould used may be a conventional confectionery mould such as a polycarbonate mould having the appropriate design. The strips of coating material may be laid, preferably in a random manner on the mould, by means of one or more nozzles through which the coating material flows. The diameter of the openings of the nozzles may be from 1 to 4mm and preferably from 2 to 3mm. The strips may consist of only one type of coating material but preferably consist of two types of coating material. The surface or configuration of the strips may be modified by either an air stream blowing onto the surface or by dragging one or more probes across the surface to give random or streaked effects forming surface impressions. Following the modification of the surface or configuration of the strips, and preferably before any significant degree of solidification of the strips occurs, the mould may be filled with an appropriate coating material and afterwards shelled by conventional confectionery techniques. Finally, a filling, e.g. ice cream, and if desired, a stick may be added. Alternatively, two corresponding halves of the strips may be joined together with or without a seal: the filling, e.g. ice cream, and if desired, a stick may be added before or after joining the two halves.

The present invention also provides a process for preparing a confectionery or ice cream product provided with a coating having a dipped generally linear marbled appearance formed from two coating materials which comprises applying two coating materials simultaneously onto the confectionery or ice cream product by dipping, enrobing or spraying to coat the confectionery or ice cream product with a layer of coating of the two different coating materials simultaneously and solidifying the coating.

One process for preparing a confectionery or ice cream product provided with a coating having a dipped generally linear marbled appearance formed from two coating materials comprises dosing two coating materials simultaneously into a container, and then dipping the confectionery or ice cream product into the container to coat the confectionery or ice cream product with a layer of coating of the two different coating materials simultaneously, withdrawing the coated confectionery or ice cream product from the container and solidifying the coating.

A confectionery or ice cream product with a chocolate coating having a blown marbled appearance may be prepared by a modification of the process for preparing a confectionery or ice cream product with a coating having a dipped generally linear marbled appearance by blowing air across the coated confectionery or ice cream product, e.g. if the coating is applied by dipping as the coated confectionery or ice cream product exits the container and solidifying the coating. The air may be, for example, compressed air.

Preferably, the container has a shape that closely follows the contour and volume of the confectionery or ice cream product. The two coating materials are preferably dosed through the bottom of the container. The first coating material advantageously differs from the second coating material, e.g. if the coating material is chocolate, one chocolate is plain or milk and the other is white. Various ratios of the two chocolate layers may be used to achieve different effects. If the coating materials are water-based coatings, they may be of different colours.

The present invention also provides a process for preparing a confectionery or ice cream product with a coating having a drizzle appearance with a roughly continuous stripe formed from two layers of coating material which comprises applying a first coating material to the confectionery product by enrobing, spraying or dipping to coat the confectionery product with a first layer of coating material, and then projecting a continuous stream of a second coating material randomly past the coated confectionery product and solidifying the coating.

One example of a process for preparing a confectionery or ice cream product with a coating having a drizzle appearance with a roughly continuous stripe formed from two layers of coating material comprises dipping the confectionery or ice cream product into a first coating material within a container to coat the confectionery or ice cream product, withdrawing the coated confectionery or ice cream product from the container and then projecting a continuous stream of a second coating material randomly past the coated confectionery product and solidifying the coating.

The present invention also provides a process for preparing a confectionery product with a coating having a splatter appearance with a roughly discontinuous stripe formed from two layers of coating material which comprises applying a first coating material to the confectionery product by enrobing, spraying or dipping to coat the confectionery product with a first layer of coating material, and then projecting a discontinuous stream of a second coating material randomly past the coated confectionery product by interrupting the flow of the second coating material and solidifying the coating.

In the above processes for preparing a confectionery product with a coating having a drizzle or a splatter appearance, the projection of the continuous or discontinuous stream of the second coating material may be carried out by moving spray nozzles or by means of centrifugal force of a spinning device. The nozzles may be operated by a pump generating a pressure of from, e.g. 50 to 150 psi, and preferably from 75 to 125 psi. The second coating material may be fed on to the upper surface of the spinning device. The spinning device is preferably a disc. The disc is preferably elliptical in shape and the flat surface may advantageously be inclined from the horizontal, e.g. up to 30° and preferably from 5 to 25°.

In one advantageous embodiment of the present invention, a confectionery product with a coating having the appearance of either stripes or spots may be obtained by applying a first coating material to the confectionery product by enrobing, spraying or dipping to coat the confectionery product with a first layer of coating material, and then passing the confectionery product between the opposing faces of a pair of spinning discs from which are projected streams of a second coating material by centrifugal force onto the coated confectionery product, and then solidifying the coating. The second coating material may be applied to the spinning discs by pumping the coating material through tubing, e.g. stainless steel, onto the spinning discs.

The spinning discs may be made of stainless steel. They may be circular or elliptical and may be of various sizes. It is possible for one disc to have a different shape or size to the other disc of the pair. The discs are preferably inclined to one another, e.g. up to an angle of 45° and preferably from 25° to 35° to the axis of conveyance of the confectionery product. Advantageously, the inclination is such that the edges of the discs downstream of the direction of conveyance of the confectionery product are closer than the edges of the discs upstream of the direction of conveyance of the confectionery product.

The discs are preferably mounted facing the front and rear center of the bars. The bar may be passed, for example, vertically or horizantally between the discs. The spinning of the discs may be achieved, for instance, by a variable drive motor for each disc or one or more motors and a timing belt. The design on the confectionery product may be controlled by the speed of the spinning discs. The speed of the discs is preferably at least 50 rpm and may be up to 2500 rpm or more, depending on the space constraints dictated by the machine the product is to be made on. The speed of the disc which produces stripes or spots is a function of the distance between the disc and the product to be coated. The spinning discs may be mounted inside a jacketed tank heated to from 35° to 45° C. by circulating heated water. The tank is conveniently made of stainless steel. The heated jacket enables the excess coating material that has been projected by centrifugal force from the spinning discs, after coating the confectionery product with the second coating material, to hit the inside of the tank in a liquid form and then exit the tank for recirculation.

In a further advantageous embodiment of the present invention, a confectionery product with a coating having the appearance of either stripes or spots may be obtained by applying a first coating material to the confectionery product by enrobing, spraying or dipping to coat the confectionery product with a first layer of coating material, and then passing the confectionery product vertically past a spinning hollow vessel provided with at least one lateral aperture from which are projected one or more streams of a second coating material by centrifugal force onto the coated confectionery product, and then solidifying the coating. The hollow vessel may be provided with an upper opening through which the second coating material may be fed by pumping the coating material through tubing, e.g. stainless steel, into the opening. During the spinning, the coating floods the and covers the inner wall of the hollow vessel. The lower end of the hollow vessel is provided with a central opening mounted on a spindle with a hollow shaft through which excess coating passes conveniently for collection and recirculation. The hollow vessel may be, for example, cup shaped, mushroom shaped or cylindrical shaped.

A similar effect to that provided by the pair of spinning discs projecting the second coating onto the confectionery product having a first layer of coating may be created using a high pressure jet of second coating impinging upon a static profiled surface from which the coating is sprayed onto the confectionery product. The high pressure jet may be produced by means of, for example, a high pressure gun provided with a nozzle having a diameter of from 0.05 to 4 mm and preferably from 0.1 to 0.25 mm. A simple valve may be used to stop and start the jets. The pressure is conveniently from 20 to 100 bar, preferably from 40–70 bar and more preferably from 45–65 bar. The static profiled surface preferably has a sharp edge and advantageously the sharp edge is adjustable about a horizontal axis in order to aim the jet. This process could reduce or eliminate the need for recirculation of the coating material, particularly if there is a requirement to spray two different coating materials at the same time, or if the primary coating was still dripping at the point of the second coating application.

In all the above processes for preparing a confectionery or ice cream product with a chocolate coating having a marbled appearance, the chocolate used may be tempered or untempered chocolate, is liquid, and the temperature may be from 28° to 60° C., preferably from 35° to 45° C.

In all the above processes for preparing a confectionery or ice cream product with a water-based coating having a marbled appearance, the temperature of usage of the water-based material is preferably such that its viscosity is similar to that of liquid chocolate used for coatings and may be, for instance, from −3° C. to +40° C.

EXAMPLES

The following Examples further illustrate the present invention.

Example 1

The accompanying FIG. 1 illustrates an ice cream bar coated with white and milk chocolate having a marbled appearance. The coating is made in two halves in a mould of polycarbonate whereby each half is made by laying 0.5 mm strips of liquid white and milk chocolate randomly across the mould using movable nozzles whose openings have a diameter of 2 mm. An air stream blown onto the strips to modify the surface configuration. The chocolate is shelled out by immediately adding liquid chocolate to completely fill the mould, followed by vibrating to remove air bubbles. The mould is then inverted with further vibration to create a shell of total thickness of 1.5 to 2 mm. The two halves of the mould are the brought together in such a way that the chocolate shells join together to form a hollow sealed 3D shape. The hollow shape is cooled, and removed from the mould to be placed into a holding device. A probe is used to create a hole at one end of the hollow shell, such that liquid ice cream at −2.5° C. can be injected into the centre. A stick is added, sealed into place with chocolate and the whole product is finally cooled at −35° C. to freeze the ice cream.

Example 2

Figure 2:
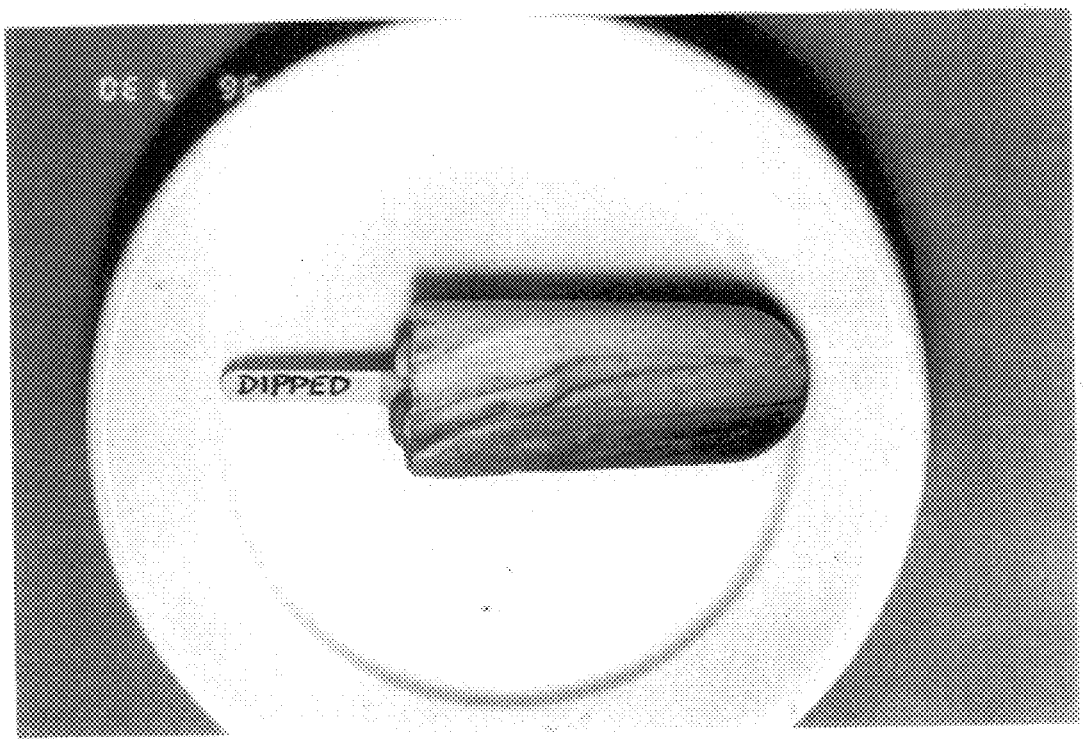
FIG. 2. illustrates an ice cream bar coated with white and milk chocolate having a dipped appearance embodiment of the present invention.

The accompanying FIG. 2 illustrates an ice cream bar coated with white and milk chocolate having a dipped appearance. The ice cream bar is dipped into a container having a shape that closely follows the the contour and volume of the ice cream bar. The coating in the container consists of two different chocolates, viz. white chocolate and milk chocolate. The two chocolates are dosed simultaneously, through the bottom of the container. The coating, consisting of the two chocolates is then allowed to solidify.

Example 3

Figure 3:
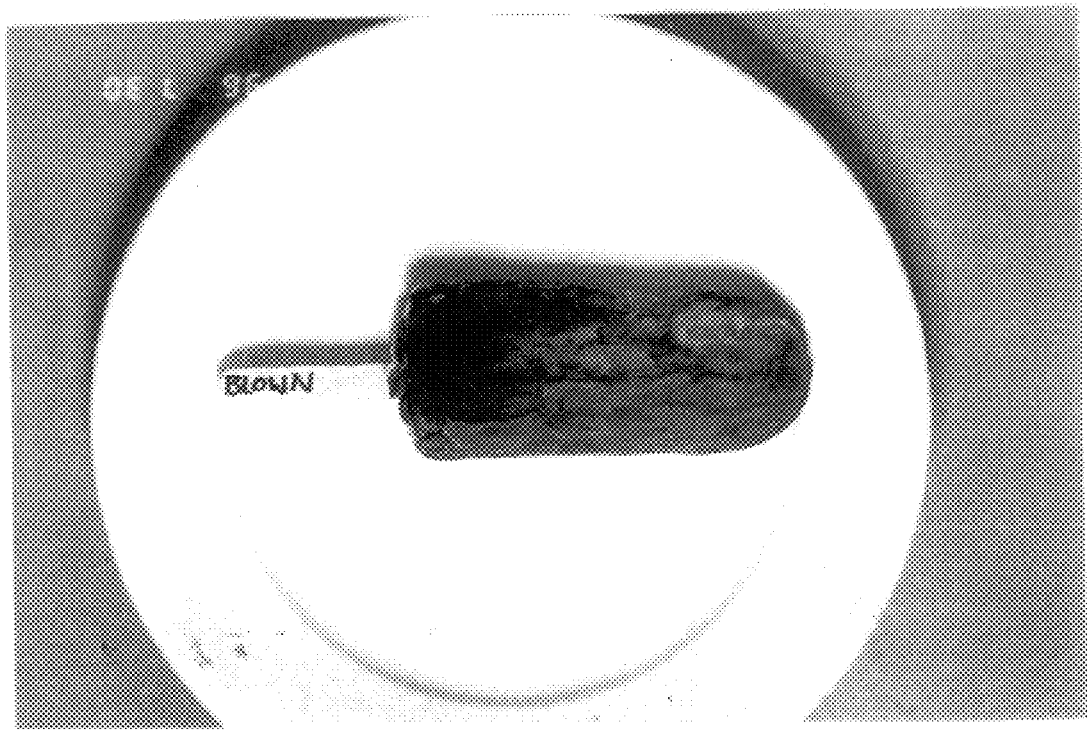
FIG. 3. illustrates an ice cream bar coated with white and milk chocolate having a blown appearance embodiment of the present invention.

The accompanying FIG. 3 illustrates an ice cream bar coated with white and milk chocolate having a blown appearance. A similar procedure to that described in Example 2 is followed except that as the ice cream exits the container, coated with the white and milk chocolates simultaneously, compressed air is blown across the coated ice cream product.

Example 4

Figure 4:
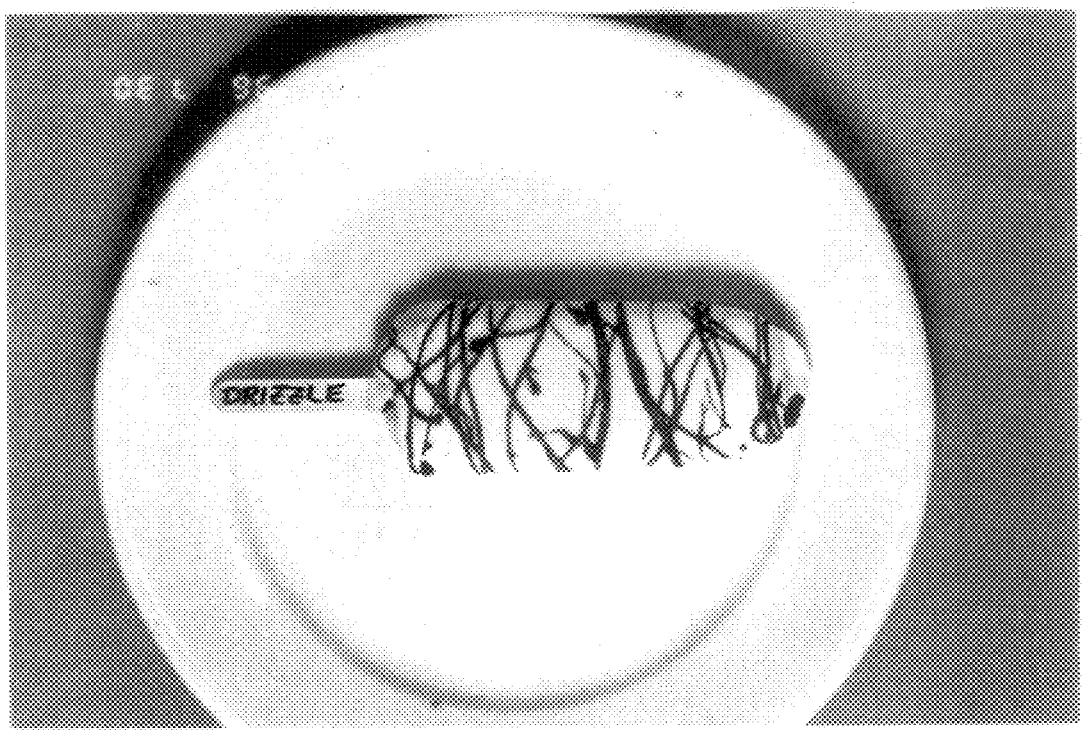
FIG. 4. illustrates an ice cream bar coated with white and plain chocolate having a drizzle appearance embodiment of the present invention.

The accompanying FIG. 4 illustrates an ice cream bar coated with white and plain chocolate having a drizzle appearance. The ice cream bar is dipped into a white chocolate within a container to coat it with a first layer of white chocolate. The ice cream coated with the first layer of white chocolate is withdrawn from the first container and a continuous stream of a plain chocolate is projected randomly past the coated confectionery product by means of moving spray nozzles operated by a pump generating a pressure of 100 psi. The coating is then solidified.

Example 5

Figure 5:
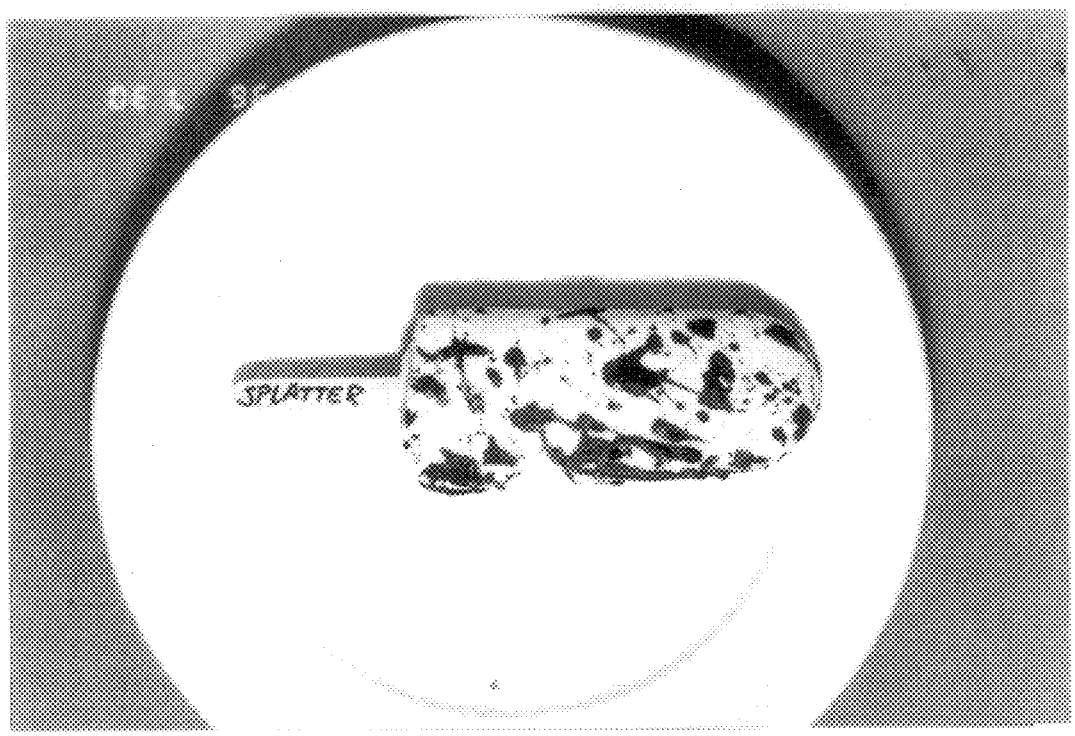
FIG. 5. illustrates an ice cream bar coated with white and milk chocolate having a splatter appearance embodiment of the present invention.

The accompanying FIG. 5 illustrates an ice cream bar coated with white and plain chocolate having a splatter appearance. A similar procedure to that described in Example 4 is followed except that the flow of the plain chocolate is interrupted to give a discontinuous stream which produces a splattered effect.

Example 6

Figure 6:
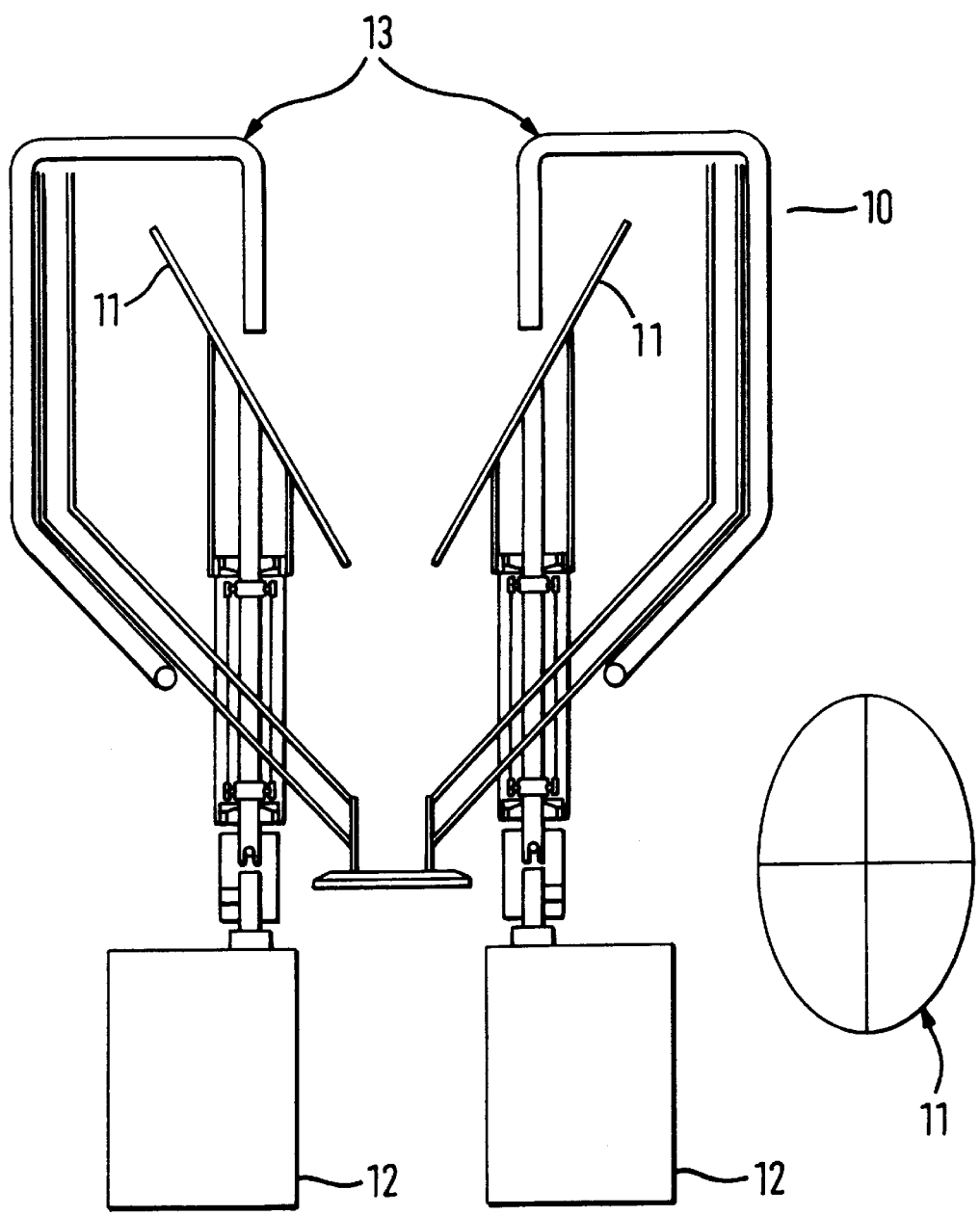
FIG. 6. illustrates an apparatus for preparing a confectionery product with the chocolate coating having the appearance of either stripes or spots using a pair of spinning disks embodiment of the present invention.

The accompanying FIG. 6 illustrates an apparatus for preparing a confectionery product with a chocolate coating having the appearance of either stripes or spots using a pair of spinning discs. The apparatus comprises a jacketed tank (10) made of stainless steel heated to 40° C. by circulating heated water, mounted within which are a pair of elliptically shaped inclined spinning discs (11) made of stainless steel driven separately by a pair of drive motors (12).

In operation, an ice cream bar coated with a first layer of white chocolate (not shown) is passed downwards in the jacketed tank (10) between the spinning discs (11) so that the front and rear center of the bar faces the discs. Milk chocolate is applied to the spinning discs rotating at a speed of from 100 to 200 rpm by pumping the chocolate from a chocolate source through stainless steel tubing (13) onto the spinning discs and is projected by centrifugal force from the spinning discs onto the front and rear faces of the ice cream bar to give a striped or spotted appearance depending on the speed of the spinning discs. Excess milk chocolate that has been projected by centrifugal force from the spinning discs which did not coat the ice cream bar hits the inside of the tank in a liquid form and then exits the tank for recirculation.

Example 7

A procedure similar to that described in Example 6 is followed except that the temperature of the jacketed tank is +4° C. and the ice cream bar is coated with two water-based coating materials having the following constitution:

| | |
|---|---|
| MILK SKIMMED POWDER SPRAY | 3.4% |
| SYRUP GLUCOSE SPRAY DRIED DE 36–39 POWDER | 3.1% |
| SUGAR LIQUID 68% SOLIDS (SUCROSE) | 12.5% |
| STARCH MAIZE MODIFIED H COL FLO 67 | 0.8% |
| WATER | 44.0% |
| LGC 450 | 1.5% |
| CHOCOLATE WHITE | 21.0% |
| CREAM MILK PASTEURISED 35% FAT LIQUID | 12.0% |
| CARRAGEENAN SATIAGEL DF 11 (VIENNOIS) | 0.12% |
| LECITHIN | 0.10% |
| COCOA BUTTER 1.40% COLOUR | 0.08% |

The only difference between the two coatings is the colour wherein the first layer is red and the second layer giving the striped or spotted appearance is light blue.

What is claimed is:

1. A process for preparing a confectionery or ice cream product with a chocolate coating having the appearance of either stripes or spots which comprises:
    applying a first chocolate coating to the confectionery or ice cream product by enrobing, spraying, or dipping to form the first chocolate coating thereon;
    passing the confectionery or ice cream product between the opposing faces of a pair of spinning discs from which are randomly projected streams of a second chocolate coating by centrifugal force directly onto the first chocolate coating; and
    solidifying the second, raised chocolate coating stream on the first chocolate coating to provide stripes or spots thereon, wherein the second chocolate stream is adhered directly to the first chocolate coating.

2. The process of claim 1, which further comprises solidifying the first chocolate coating simultaneously with the second chocolate coating.

3. A process for preparing a confectionery or ice cream product with a chocolate coating having the appearance of either stripes or spots which comprises:
    applying a first chocolate coating to the confectionery or ice cream product by enrobing, spraying, or dipping to form the first chocolate coating thereon;
    passing the confectionery or ice cream product vertically past a spinning hollow vessel provided with at least one lateral aperture from which are randomly projected one or more streams of a second chocolate coating by centrifugal force directly onto the first chocolate coating; and
    solidifying the second, raised chocolate coating stream on the first chocolate coating to provide stripes or spots thereon, wherein the second chocolate stream is adhered directly to the first chocolate coating.

4. The process according to claim 3 wherein the hollow vessel having a lower end is provided with an upper opening through which the second chocolate coating is fed by pumping the chocolate coating through a portion of the vessel to the at least one lateral aperture.

5. The process according to claim 3 wherein the lower end of the hollow vessel is provided with a central opening having a hollow shaft through which excess coating is removed from the vessel.

6. The process of claim 3, which further comprises solidifying the first chocolate coating simultaneously with the second chocolate coating.

7. The process of claim 3 wherein the spinning hollow vessel is cup shaped, mushroom shaped, or cylindrically shaped.

8. A process for preparing a chocolate coated confectionary or ice cream product comprising:
    applying a first chocolate coating to the confectionary or ice cream product by enrobing, spraying, or dipping to form the first chocolate coating thereon;
    passing the confectionary or ice cream product past a chocolate dispensing device from which is randomly projected a stream of a second chocolate coating by centrifugal force directly onto the first chocolate coating; and
    solidifying the second raised chocolate coating stream on the first chocolate coating, wherein the second chocolate coating is adhered directly to the first chocolate coating.

9. The process of claim 8, which further comprises solidifying the first chocolate coating simultaneously with the second chocolate coating.

10. The process of claim 8 wherein the chocolate dispensing device is a pair of opposingly faced and angled spinning discs, the stream of second chocolate coating is a continuous stream, and the confectionary or ice cream product is passed between the pair of spinning discs to produce a chocolate coating having a drizzle-appearance.

11. The process of claim 8 wherein the chocolate dispensing device is a pair of opposingly faced and angled spinning discs; the confectionary or ice cream product is passed between the pair of spinning discs, and further comprising interrupting the stream of second chocolate coating to create a discontinuous stream to produce a chocolate coating having a splatter-appearance.

* * * * *

UNITED STATES PATENT AND TRADEMARK OFFICE
CERTIFICATE OF CORRECTION

PATENT NO. : 6,194,014 B1
DATED : February 27, 2001
INVENTOR(S) : Busse et al.

Page 1 of 1

It is certified that error appears in the above-identified patent and that said Letters Patent is hereby corrected as shown below:

<u>Title page,</u>
After "[22] Filed: Dec 5, 1997", insert:

-- Related U.S. Application Data
Item [63] continuation-in-part of application No. 08/901,727, filed on July 28, 1997, now abandoned, which is a continuation-in-part of application No. 08/771,788 filed on December 20, 1996, now abandoned. --., Signed and Sealed this Sixteenth Day of October, 2001

Attest:

*Nicholas P. Godici*

NICHOLAS P. GODICI
*Attesting Officer*   *Acting Director of the United States Patent and Trademark Office*